Dec. 22, 1959   A. S. CASSINELLI   2,917,964
BRASS INSTRUMENT MOUTHPIECE
Filed Aug. 6, 1959   3 Sheets-Sheet 1

INVENTOR
Alfred S. Cassinelli
BY
ATTORNEY

Dec. 22, 1959  A. S. CASSINELLI  2,917,964
BRASS INSTRUMENT MOUTHPIECE
Filed Aug. 6, 1959  3 Sheets-Sheet 2

INVENTOR
Alfred S. Cassinelli
BY
ATTORNEY

Dec. 22, 1959     A. S. CASSINELLI     2,917,964
BRASS INSTRUMENT MOUTHPIECE
Filed Aug. 6, 1959     3 Sheets-Sheet 3
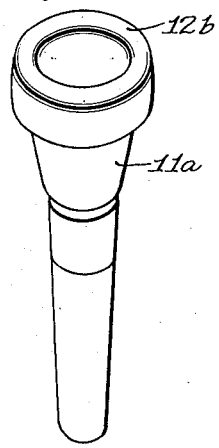
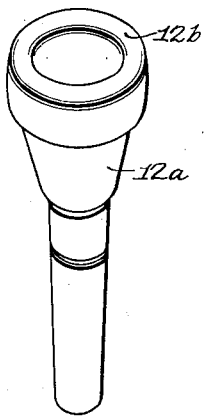
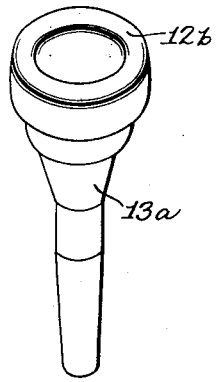
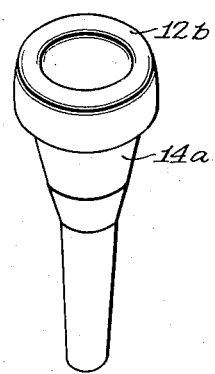
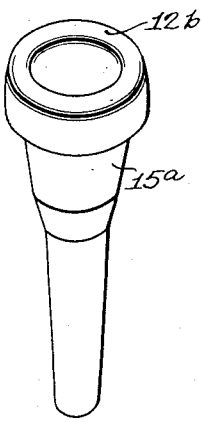
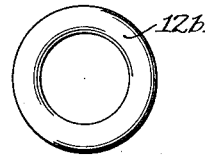
INVENTOR
Alfred S. Cassinelli
BY
ATTORNEY United States Patent Office 2,917,964
Patented Dec. 22, 1959

2,917,964
BRASS INSTRUMENT MOUTHPIECE
Alfred S. Cassinelli, Milford, Mass.
Application August 6, 1959, Serial No. 831,998
5 Claims. (Cl. 84—398)

This invention relates to certain new and useful improvements in brass instrument mouthpieces and is a continuation-in-part of my application Serial No. 645,172, filed March 11, 1957.

The mouthpiece disclosed herein is for a particular member of the family of brass instruments and the principal object of the invention is to provide a mouthpiece for that particular instrument that will enable a musician, who may have been specially trained to play another member of that family, to shift readily without hurting his embouchure as determined by such other instrument. Hereinafter, the instrument the mouthpiece is to fit is sometimes referred to as the first brass instrument and the instrument the musician is especially interested in as the second brass instrument. No distinction is made between trumpets and cornets which, because of their similarity, may be regarded as the same instrument for the purposes of this invention.

As an example, a musician, who is trained to play a trumpet, can also perform on a trombone or similar instrument, provided that it is equipped with a mouthpiece in accordance with the invention without adversely affecting his skill as a trumpet player. In fact, the playing of a trombone, so equipped, will result in an improvement of his capibilities as a trumpet player. Thus, the invention qualifies a trumpet player to shift, during a musical performance, from trumpet to trombone and back to trumpet without difficulty, while giving full tone, quality, volume, resonance, and brilliance to each instrument.

It is well known that each of these brass instruments requires great skill, ability, and practice to produce the desired full legitimate tones of each, and so far as known, no mouthpiece has heretofore been developed which permits such interchangeability. Attempts have been made along this line, but without success, although mouthpieces have been made for either a trumpet or cornet. These two last-named instruments, however, as has been noted, are practically duplicates and thus present no such problem as does exist in changing from trumpet or cornet to a trombone, French horn, mellophone, bass trumpet, alto horn, baritone or other brass instrument. Such changes may be made in accordance with the invention as may also be made changes from trombone to trumpet, French horn, mellophone, alto horn, bass trumpet, baritone, tuba, Sousaphone or other brass instruments or between any two brass instruments.

It was discovered that by providing a mouthpiece with a conventionally shaped and dimensioned trumpet rim and then forming the cup area with an air capacity substantially equivalent to that of a trombone mouthpiece with correlated throat and backbore, a trumpet player can produce a full trombone sound and tone without endangering his embouchure. It is to be understood when trumpet and trombone mouthpieces are mentioned herein that the above objects may be accomplished with any two brass instruments wherein the mouthpiece is for use with a first brass instrument with its rim diameter conventional for the second brass instrument and its cup capacity with correlated throat and backbore in use, is approximately equal to that of the first instrument. Hereinafter, the expression "cup capacity" when used in connection with mouthpieces in accordance with the invention means cup capacity with correlated throat and backbore.

In carrying out the invention, the rim of the mouthpiece is conventionally shaped as to curvature, thickness, "bite," and diameter and the cup is formed with an air capacity approximately equal to that of a trombone mouthpiece of normal size, the throat and backbore, and all being properly correlated and proportioned.

Referring to the drawings illustrating preferred embodiments of the improved mouthpiece:

Fig. 11 is a perspective view of a brass instrument mouthpiece with a trumpet rim and cup diameter, for a trumpet;

Fig. 12 is a perspective view of a mouthpiece with a trumpet rim and cup diameter, for trombone, baritone or bass trumpet;

Fig. 13 is a perspective view of a mouthpiece with a trumpet rim and cup diameter for a French horn;

Fig. 14 is a perspective view of a mouthpiece with a trumpet rim and cup diameter, for a mellophone;

Fig. 15 is a perspective view of a mouthpiece with a trumpet rim and cup diameter for an alto horn, and Fig. 16 is a plan view of the same rim of each mouthpiece of Figs. 11 to 15.

Figure 1:
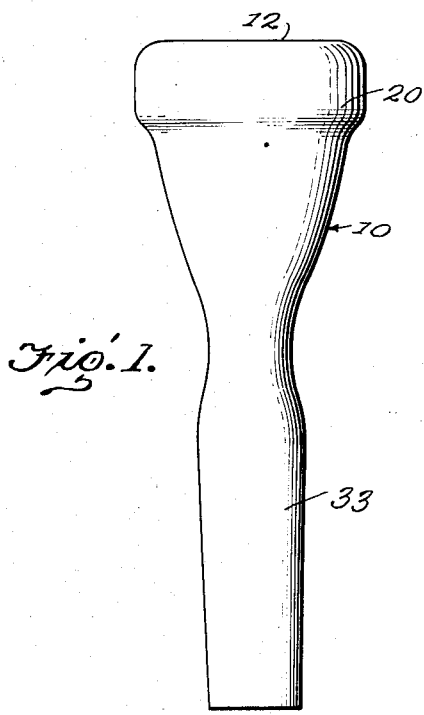
Fig. 1 is a side elevational view of the improved trombone mouthpiece.

As shown in the drawings, 10 designates generally an improved mouthpiece wherein the rim 12, cup diameter 14, and bite 15 are of a normal or standard type, size, and construction for a trumpet mouthpiece.

The rim is preferably an integral part of the cup 20, which cup is formed with a substantially greater depth than that in an ordinary trumpet mouthpiece, and, furthermore, may be formed with substantially inner straight or vertical walls 11 from the rim downwardly, then merging into an inwardly curved contour 22 and ending at a shoulder 25 with a definite rim or ridge at substantially a sharp angle as shown in the drawings where the shoulder opens into the cylindrical throat 30 whence the throat is shown as expanding into the backbore 33 of the mouthpiece.

It will be appreciated that a trumpet player using a trumpet rim on a mouthpiece to which he is accustomed may instantly transfer his musical skill from a trumpet to this novel trombone mouthpiece because of its similarity with the rim portion of the instrument to which his training, practice, and efficiency have been developed. It will also be understood that a musician trained on any one particular brass instrument and, accustomed to its particular mouthpiece rim, may easily transfer to another brass instrument utilizing the same rim but with a modified cup capacity with throat and backbore being correlated to that particularly cup capacity.

Figure 2:
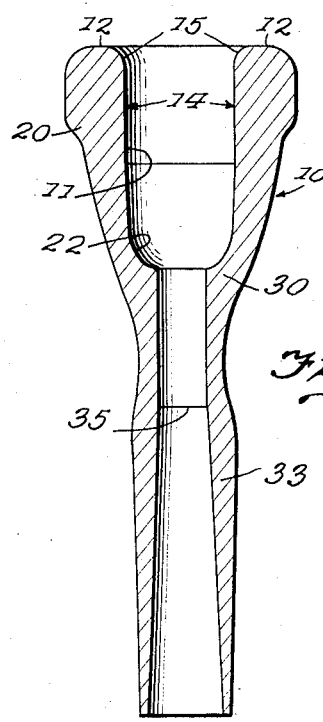
Fig. 2 is a longitudinal cross-section.
Figure 2A:
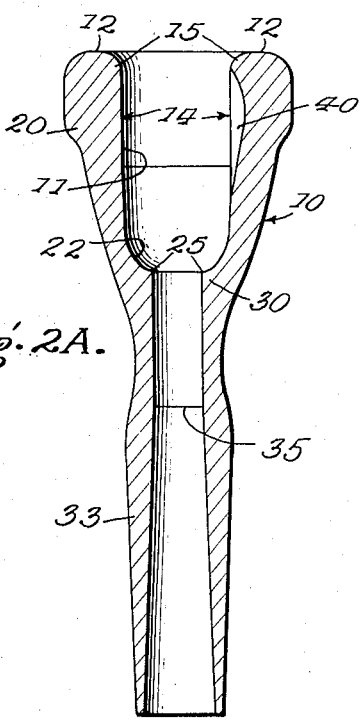
Fig. 2A is a fragmentary sectional view of the end of the mouthpiece shown in Fig. 2 with a slight concavity in the inner wall of the cup portion.

While the upper portion of the inner wall 11 of the cup of the improved trombone mouthpiece is shown as substantially vertical, it may be advisable in some instances to slightly concave the same just below the rim, as indicated in full lines at 40 in Fig. 2A or otherwise to modify its shape as to an inward curve eliminating any sharp shoulder, provided that the curvature, shoulder, throat and backbore are correlated to that particular cup contour and capacity.

Figure 5:
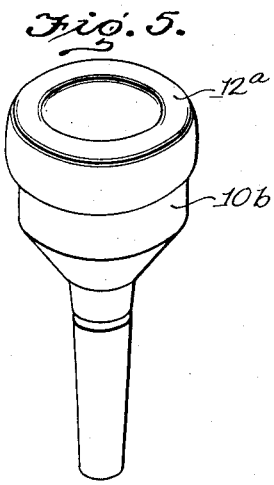
Fig. 5 is a perspective view of a mouthpiece with trombone rim and cup diameter, for a trombone, baritone, and bass trumpet.
Figure 6:
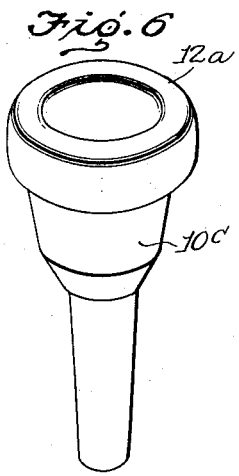
Fig. 6 is a perspective view of a mouthpiece with a trombone rim and cup diameter, for an alto horn.
Figure 7:
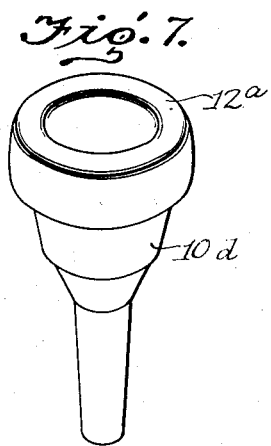
Fig. 7 is a perspective view of a mouthpiece of a trombone rim and cup diameter, for a mellophone.
Figure 8:
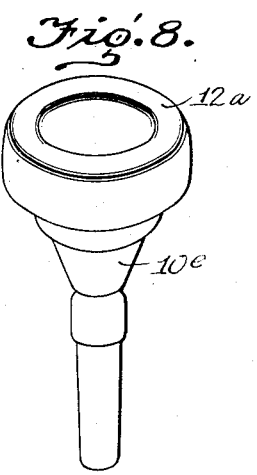
Fig. 8 is a perspective view of a mouthpiece with a trombone rim and cup diameter, for a French horn.
Figure 9:
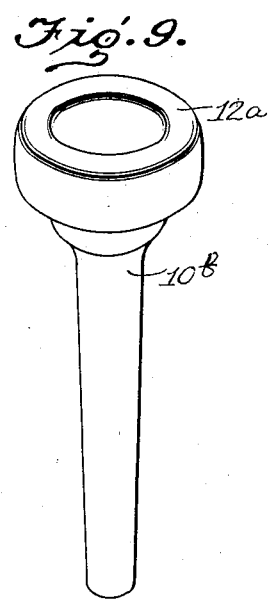
Fig. 9 is a perspective view of a mouthpiece with a trombone rim and cup diameter for a trumpet.
Figure 10:
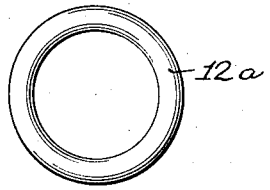
Fig. 10 is a plan view showing the same rim of each mouthpiece of Figs. 4 to 9.

In Fig. 10 there is illustrated a trombone mouthpiece rim 12a that is common to each of the diagrammatically shown brass mouthpiece instruments in Figs. 4 to 9. The mouthpiece 10a of Fig. 5 represents a trombone, baritone or bass trumpet, the mouthpiece 10c of Fig. 6 represents an alto horn, the mouthpiece 10d of Fig. 7 represents a mellophone, the mouthpiece 10e of Fig. 8 represents a French horn, while the mouthpiece 10f of Fig. 9 represents a trumpet. The mouthpieces of Figs. 4–9 have the same diameter of their rims on their respective cups that is required by the embouchure of the musician in playing his preferred instrument (the second brass instrument). The mouthpieces of Figs. 4–9 differ in that each has a cup capacity (to which curvature, shoulder, throat, and backbore are correlated) required in use by the instrument it is to fit (the first brass instrument).

Figure 3:
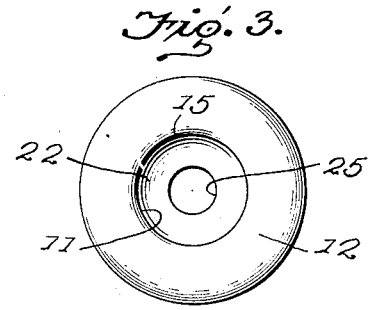
Fig. 3 is a plan view looking from the top of the rim.
Figure 4:
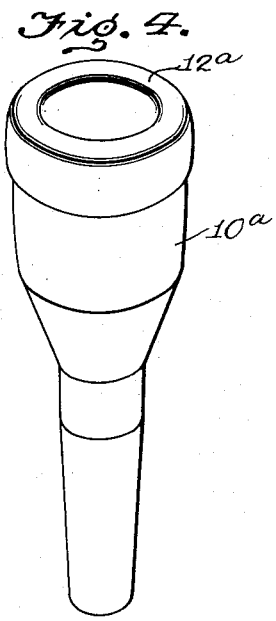
Fig. 4 is a perspective view of a brass instrument mouthpiece with a trombone rim and cup diameter for a tuba or Sousaphone.

In a like manner, Fig. 16 shows a trumpet mouthpiece rim 12b that is common to each of the diagrammatically illustrated mouthpiece instruments of Figs. 11 to 15. The mouthpiece 11a of Fig. 11 represents a trombone, baritone or bass trumpet, the mouthpiece 13b of Fig. 3 represents a French horn, the mouthpiece 15a of Fig. 15 represents an alto horn.

While the rims of trumpets and trombones have been illustrated herein in association with mouthpieces of other brass instruments, it will be understood that a mouthpiece rim of any one brass instrument may be associated with a mouthpiece of a different brass instrument, all for the purpose hereinbefore set forth provided the cup capacity is varied with the air capacity required in the use of the different brass instruments and the throat and backbore are correlated to that cup capacity.

It is believed that the invention enables for the first time in this art, the full tonal qualities of a first brass instrument to be developed with a mouthpiece required by the embouchure of a player of a second brass instrument.

I claim:

1. A mouthpiece for a brass musical instrument having a backbore portion of the type to fit a first brass instrument mouth pipe, a cup portion operatively associated with said backbore portion, said cup portion having a cup of a capacity equivalent to that of said first brass instrument mouthpiece, and a rim on said cup portion of a diameter which is substantially the same as that of a conventional second brass instrument mouthpiece.

2. A mouthpiece for a brass musical instrument having a backbore portion of the type to fit a trombone mouth pipe, a cup portion operatively associated with said backbore portion, said cup portion having a cup of a capacity equivalent to that of a conventional trombone mouthpiece and a rim on said cup portion of a diameter which is substantially the same as that of a conventional cornet or trumpet mouthpiece.

3. A mouthpiece for a brass musical instrument having a backbore portion of the type to fit a trumpet mouthpipe, a cup portion operatively associated with said backbore portion, said cup portion having a cup of a capacity equivalent to that of a conventional trumpet mouthpiece and a rim on said cup portion of a diameter which is substantially the same as that of a conventional trombone mouthpiece.

4. A mouthpiece for a brass musical instrument having a backbore portion of the type to fit a trombone mouth pipe, a cup portion operatively associated with said backbore portion, said cup portion having a cup of a capacity equivalent to that of a conventional trombone mouthpiece and a rim on said cup portion of a diameter which is substantially the same as that of a conventional mouthpiece of a second brass instrument.

5. A mouthpiece for a brass musical instrument having a backbore portion of the type to fit a trumpet mouth pipe, a cup portion operatively associated with said backbore portion, said cup portion having a cup of a capacity equivalent to that of a conventional trumpet mouthpiece and a rim on said cup portion of a diameter which is substantially the same as that of a conventional mouthpiece of a second brass instrument.

No references cited.